(12) United States Patent
Fernandes et al.

(10) Patent No.: US 12,287,397 B2
(45) Date of Patent: Apr. 29, 2025

(54) FOOTWEAR SCANNING SYSTEMS AND METHODS

(71) Applicant: Battelle Memorial Institute, Richland, WA (US)

(72) Inventors: Justin L. Fernandes, Kennewick, WA (US); Douglas L. McMakin, Richland, WA (US); David M. Sheen, Richland, WA (US); Jonathan R. Tedeschi, Richland, WA (US); Thomas E. Hall, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 854 days.

(21) Appl. No.: 15/658,111

(22) Filed: Jul. 24, 2017

(65) Prior Publication Data

US 2023/0273310 A1 Aug. 31, 2023

Related U.S. Application Data

(62) Division of application No. 13/870,835, filed on Apr. 25, 2013, now Pat. No. 9,715,012.

(51) Int. Cl.
*G01S 13/88* (2006.01)
*G01S 7/41* (2006.01)
(Continued)

(52) U.S. Cl.
CPC ............. *G01S 13/887* (2013.01); *G01S 7/41* (2013.01); *G01S 13/89* (2013.01); *G01V 3/12* (2013.01); *G01V 8/005* (2013.01)

(58) Field of Classification Search
CPC .. G01S 7/41–418; G01S 13/887; G01S 13/89; G01S 13/888; G01V 3/12; G01V 8/005
See application file for complete search history.

(56) References Cited

U.S. PATENT DOCUMENTS 5,408,244 A * 4/1995 Mackenzie ............ H01Q 1/422
343/872
5,455,590 A 10/1995 Collins et al.
(Continued)

FOREIGN PATENT DOCUMENTS

AU 2014257461 4/2017
CN 102508205 7/2013
(Continued)

OTHER PUBLICATIONS

D. M. Sheen, D. L. McMakin and T. E. Hall, "Three-dimensional millimeter-wave imaging for concealed weapon detection," in IEEE Transactions on Microwave Theory and Techniques, vol. 49, No. 9, pp. 1581-1592, Sep. 2001. doi: 10.1109/22.942570 (Year: 2001).*
(Continued)

*Primary Examiner* — Matthew M Barker
(74) *Attorney, Agent, or Firm* — Wells St. John P.S.

(57) ABSTRACT

Methods and apparatus for scanning articles, such as footwear, to provide information regarding the contents of the articles are described. According to one aspect, a footwear scanning system includes a platform configured to contact footwear to be scanned, an antenna array configured to transmit electromagnetic waves through the platform into the footwear and to receive electromagnetic waves from the footwear and the platform, a transceiver coupled with antennas of the antenna array and configured to apply electrical signals to at least one of the antennas to generate the transmitted electromagnetic waves and to receive electrical signals from at least another of the antennas corresponding to the electromagnetic waves received by the others of the antennas, and processing circuitry configured to process the received electrical signals from the transceiver to provide information regarding contents within the footwear.

24 Claims, 8 Drawing Sheets

(51) Int. Cl.
*G01S 13/89* (2006.01)
*G01V 3/12* (2006.01)
*G01V 8/00* (2006.01)

(56) References Cited

U.S. PATENT DOCUMENTS

| | | | |
|---|---|---|---|
| 5,557,283 | A | 9/1996 | Sheen et al. |
| 6,970,087 | B2 | 11/2005 | Stis |
| 7,034,746 | B1 | 4/2006 | McMakin et al. |
| 7,106,058 | B2 | 9/2006 | Wilker et al. |
| 7,253,766 | B2 | 8/2007 | Foote et al. |
| 7,292,033 | B2 | 11/2007 | Pusiol |
| 7,295,146 | B2 | 11/2007 | McMakin et al. |
| 7,327,137 | B1 | 2/2008 | Crowley et al. |
| 7,365,672 | B2 * | 4/2008 | Keller ............... G01N 21/3581 342/179 |
| 7,397,239 | B1 | 7/2008 | Crowley et al. |
| 7,405,692 | B2 | 7/2008 | McMakin et al. |
| 7,511,514 | B2 | 3/2009 | Crowley et al. |
| 7,548,185 | B2 * | 6/2009 | Sheen ................ G01S 13/89 342/22 |
| 7,595,638 | B2 | 9/2009 | Crowley |
| 7,750,631 | B2 | 7/2010 | Crowley |
| 7,763,868 | B2 | 7/2010 | Ouchi et al. |
| 7,804,442 | B2 | 9/2010 | Ammar |
| 7,868,758 | B2 | 1/2011 | Barral et al. |
| 7,986,260 | B2 | 7/2011 | McMakin et al. |
| 8,278,921 | B2 | 10/2012 | Crowley |
| 8,487,820 | B2 * | 7/2013 | Tajima ............... B60R 13/005 343/713 |
| 8,525,515 | B2 | 9/2013 | Itozaki |
| 8,531,915 | B2 | 9/2013 | Ammar |
| 8,654,922 | B2 | 2/2014 | Bendahan |
| 8,937,570 | B2 | 1/2015 | Sheen |
| 9,024,804 | B2 * | 5/2015 | Shi .................... H01Q 1/3291 342/55 |
| 9,715,012 | B2 | 7/2017 | Fernandes et al. |
| 2004/0222790 | A1 | 11/2004 | Karmi et al. |
| 2005/0073307 | A1 | 4/2005 | Manneschi |
| 2005/0116825 | A1 | 6/2005 | Manneschi |
| 2005/0232487 | A1 * | 10/2005 | Fleisher ............... G01V 8/005 382/181 |
| 2006/0104480 | A1 * | 5/2006 | Fleisher ............... G01S 13/89 382/103 |
| 2007/0073492 | A1 | 3/2007 | Manneschi |
| 2007/0158571 | A1 | 7/2007 | Cole et al. |
| 2007/0211922 | A1 | 9/2007 | Crowley et al. |
| 2007/0263907 | A1 | 11/2007 | McMakin et al. |
| 2008/0164420 | A1 | 7/2008 | Manneschi |
| 2009/0058710 | A1 | 3/2009 | Levitan et al. |
| 2009/0314943 | A1 | 12/2009 | Breit et al. |
| 2009/0322866 | A1 | 12/2009 | Stotz et al. |
| 2010/0123571 | A1 | 5/2010 | Crowley et al. |
| 2010/0213365 | A1 | 8/2010 | Crowley et al. |
| 2011/0129063 | A1 | 6/2011 | Bendahan |
| 2011/0163876 | A1 | 7/2011 | Uemura et al. |
| 2012/0069963 | A1 | 3/2012 | Song et al. |
| 2012/0307967 | A1 | 12/2012 | Smith |
| 2014/0091965 | A1 | 4/2014 | Sheen |
| 2014/0182370 | A1 * | 7/2014 | Kienzle ............... H01Q 1/225 73/290 V |
| 2014/0320331 | A1 | 10/2014 | Fernandes et al. |
| 2015/0369756 | A1 | 12/2015 | Rezgiu et al. |

FOREIGN PATENT DOCUMENTS

| | | |
|---|---|---|
| DE | 10 2010 014795 | 7/2011 |
| EP | 2 302 413 | 3/2011 |
| WO | WO PCT/US2014/031501 | 10/2015 |
| WO | WO PCT/US2021/027232 | 8/2021 |

OTHER PUBLICATIONS

Busch, Kenn. "Recycling Program Adds to Rubber Flooring's Environmental Advantages". Jul. 9, 2010. <https://iands.design/articles/41001/recycling-program-adds-rubber-floorings-environmental-advantages> (Year: 2010).*

Osmun, Sandra. "What We Didn't Know About Dielectric Properties of Plastics" May 1, 2004. < https://www.ptonline.com/articles/what-we-didn't-know-about-dielectric-properties-of-plastics> (Year: 2004).*

Fumeaux, "Finite-Volume Time-Domain Analysis of a Cavity-Backed Archimediean Spiral Antenna", IEEE Transactions on Antennas and Propagation, 2006, 54(3), United States, pp. 844-851.

Keller et al., "Privacy Algorithm for Airport Passenger Screening Portal", Proceedings of SPIE 4055, Applications and Science of Computational Intelligence III 476, Mar. 30, 2000, United States, pp. 476-483.

McMakin et al., "Biometric Identification using Holographic Radar Imaging Techniques", Proceedings of SPIE 6538, Sensors, and Command, Control, Communications, and Intelligence (C31) Technologies for Homeland Security and Homeland Defense VI 65380C, Apr. 27, 2007, United States, 12 pages.

McMakin et al., "Dual-Surface Dielectric Depth Detector for Holographic Millimeter-Wave Security Scanners", Proceedings of SPIE 7309, Passive Millimeter-Wave Imaging Technology XII 73090G, May 1, 2009, United States, 10 pages.

McMakin et al., "Holographic Radar Imaging Privacy Techniques Utilizing Dual-Frequency Implementation", Proceedings of SPIE 6943, Sensors, and Command, Control, Communications, and Intelligence (C31) Technologies for Homeland Security and Homeland Defense VII 69430P, Apr. 3, 2008, United States 10 pages.

Mensa, D., "High Resolution Radar Cross-Section Imaging", Norwood, MA, Artech House, 1991, 10 pages.

Sheen et al., "Combined Illumination Cylindrical Millimeter-Wave Imaging Technique for Concealed Weapon Detection", Proceedings of SPIE, 2000, 4032, United States, pp. 52-60.

Soumekh, "A System Model and Inversion for Synthetic Aperture Radar Imaging", IEEE Transactions on Image Processing, 1992, 1(1), United States, pp. 64-76.

VolumeRover, Computational Visualization Center. Printed from the Internet Apr. 3, 2013, http:/www.cs.utexas.edu/~bajaj/cvcwp/?page_id=100, 3 pages.

Ahmed et al., "A Novel Fully Electronic Active Real-Time Imager Based on a Planar Multistatic Sparse Array", IEEE Transactions on Microwave Theory and Techniques vol. 59, No. 12, Dec. 2011, United States, pp. 3567-3576.

Fernandes et al. "Three-Dimensional Millimeter-Wave Imaging for Concealed Threat Detection in Shoes", SPIE Defense, Security, and Sensing Proceedings vol. 8715, Baltimore, Maryland, 2013, United States, 8 pages.

Jones et al., "Wideband Archimedean Spiral Antenna for Millimeter-Wave Imaging Array", IEEE International Symposium on Antennas and Propagation USNC/URSI National Radio Science Meeting, 2017, United States, pp. 845-846.

Sheen et al., "Near-Field Three-Dimensional Radar Imaging Techniques and Applications", Applied Optics vol. 49, No. 19, Jul. 2010, United States, pp. E83-E93.

Sheen et al., "Wide-Bandwidth, Wide-Beamwidth, High-Resolution, Millimeter-Wave Imaging for Concealed Weapon Detection", SPIE Defense, Security, and Sensing Proceedings vol. 8715, Baltimore, Maryland, 2013, United States, 11 pages.

Sheen et al., U.S. Appl. No. 63/012,622, filed Apr. 20, 2020, titled "Footwear Scanning Systems and Associated Methods", 43 pages.

Sheen, "Sparse Multi-Static Arrays for Near-Field Millimeter-Wave Imaging", IEEE Global Conference on Signal and Information Processing (GlobalSIP), Dec. 2013, United States, pp. 699-702.

Jones et al., U.S. Appl. No. 16/894,484, filed Jun. 5, 2020, titled "Footwear Scanning Systems and Methods", 50 pages.

* cited by examiner

FOOTWEAR SCANNING SYSTEMS AND METHODS

RELATED PATENT DATA

This application is a divisional of and claims priority to U.S. patent application Ser. No. 13/870,835, which was filed Apr. 25, 2013, titled "Footwear Scanning Systems and Methods", the teachings of which are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

BACKGROUND OF THE DISCLOSURE

Systems have been utilized to enhance security at numerous public venues, including airports, public arenas, courthouses, etc. These systems have been primarily directed towards detecting objects, such as weapons, explosives, etc. which are concealed under clothing of individuals. However, these systems have had difficulty detecting such objects concealed within a heterogeneous environment, such as footwear which typically include different layers of different types of materials.

Accordingly, in some applications, individuals being screened are required to remove footwear for different inspection. Divestment of footwear during the scanning process is a significant impediment to efficient screening and may result in reduced throughput at security checkpoints, increased inconvenience, lost revenue and/or lost productivity.

At least some aspects of the present disclosure are directed towards methods and apparatus for screening footwear to identify objects therein.

DETAILED DESCRIPTION OF THE DISCLOSURE

At least some aspects of the disclosure are directed towards apparatus and methods for detecting objects which may be concealed. For example, at least some of the described aspects may be utilized in applications to detect objects, such as weapons, which may be concealed on individuals. In one example possible application, these apparatus and methods may be implemented in checkpoints at public venues, such as airports, public events, sporting events, courthouses, and concerts, to reduce threats posed by the objects and individuals.

As described below, the apparatus and methods may be utilized to detect objects which may be concealed within heterogeneous articles, such as footwear. Example footwear which may be scanned include shoes, boots, sandals, flip-flops, moccasins, etc. and which may be made of numerous different types of materials.

Scanning of footwear poses additional challenges compared with personnel screening. For example, the phenomenology associated with imaging within a heterogeneous medium, such as shoes, dictates limits for imaging system parameters. Scattering, defocusing, and multipath artifacts are significantly exaggerated due to the high contrast index of refraction associated with a boundary of air and the footwear interface.

Active millimeter-wave radar imaging is utilized to perform threat detection in non-divested footwear in one implementation. In one embodiment, a full three dimensional reconstruction of the footwear being scanned is generated. Additional details regarding an active near field imaging technique are discussed in Sheen et. al., *Combined Illumination Cylindrical Millimeter-Wave Imaging Technique For Concealed Weapon Detection*, Proceedings of SPIE, 2000, 4032, p 52-60, the teachings of which are incorporated herein by reference.

Allowing the scanning of footwear to detect objects concealed within the footwear without requiring removal of the footwear from the individual may provide increased throughput and convenience compared with other scanning arrangements which require divesting of the footwear for scanning purposes.

Figure 1:
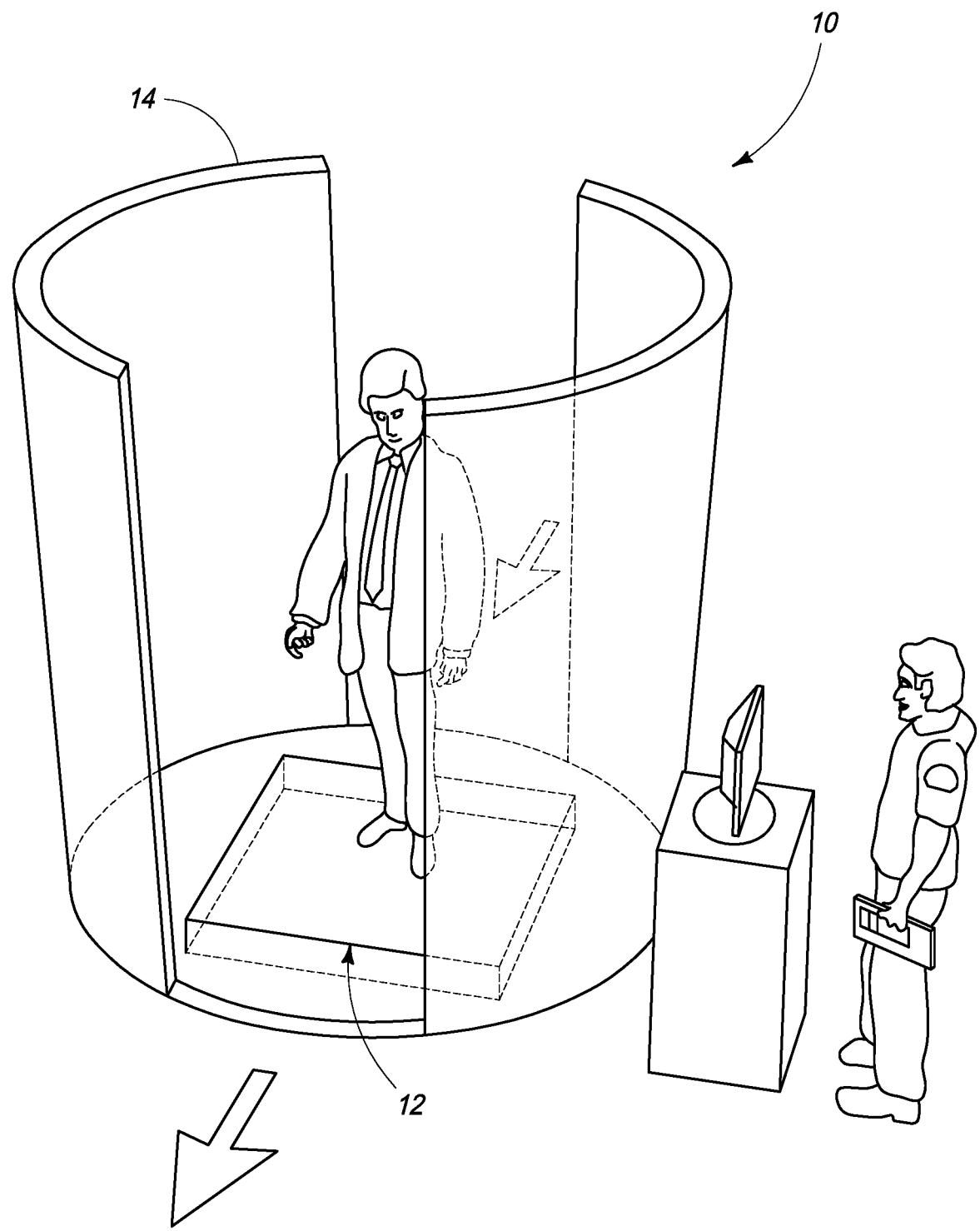
FIG. 1 is an illustrative representation of a threat detection system according to one embodiment.

Referring to FIG. 1, an example threat detection system 10 is shown according to one embodiment. The system 10 may be installed in one example application at points of ingress/egress of a public facility. A person to be screened enters the system 10 which attempts to detect the presence of concealed objects, such as weapons or explosives, upon the individual. As described in additional detail below, system 10 includes a footwear scanning system 12 which is configured to identify objects which are concealed within footwear of people being screened.

In one described embodiment, individuals may be screened to attempt to locate objects which are concealed within their footwear while the individuals are wearing the footwear and without prior divesting or removal of the footwear from the individuals.

Threat detection system 10 may also include an additional personnel scanning system 14 which is configured to identify objects which are concealed within clothing of the people being screened.

Figure 2:
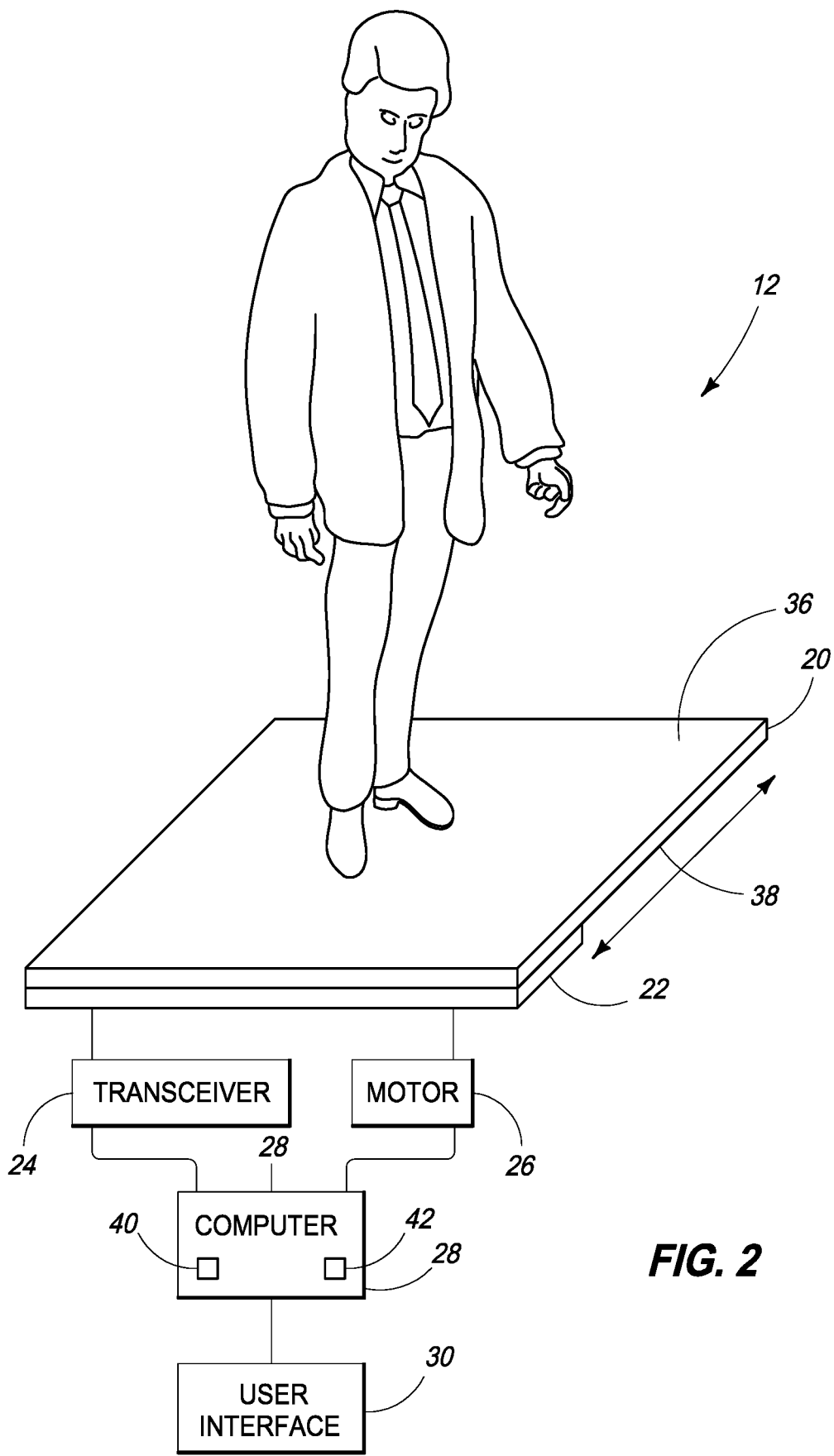
FIG. 2 is an illustrative representation of a threat detection system according to one embodiment.

Referring to FIG. 2, additional details regarding the footwear scanning system 12 are shown according to one embodiment. The illustrated system 12 includes a platform 20, antenna array 22, transceiver 24, motor 26, computer 28, and user interface 30. Other embodiments are possible including more, less and/or alternative components.

As shown in the example embodiment, an individual stands upon the platform 20 during scanning operations with respect to the individual's footwear. The platform 20 includes an upper surface 36 which is configured to reduce reflections of electromagnetic waves being transmitted through an interface between the platform 20 and the individual's footwear. Furthermore, the opposite lower surface 38 of the platform 20 is configured to reduce reflections of the electromagnetic waves being transmitted through an interface between the platform 20 and antenna array 22.

Although an example embodiment is described herein which utilizes electromagnetic radiation to perform the scanning, acoustics or ultrasonic scanning may be utilized in other embodiments.

The antenna array 22 is embodied within a movable scanning device and adjacent to lower surface 38 of platform 20 in the depicted embodiment. Antenna array 22 is implemented as a quasi-monostatic array configured to emit electromagnetic waves upwardly through platform 20 and into the footwear of the individual in one embodiment. The electromagnetic waves transmitted by antenna array 22 are reflected downwardly from the footwear and again pass through platform 20 and are subsequently received by the antenna array 22. As described below with respect to FIG. 3, the antenna array 22 may be moved beneath and in contact with platform 20 during scanning operations. Additional details regarding antenna array 22 are discussed below with respect to FIGS. 4A and 4B and in U.S. Pat. Nos. 5,455,590 and 5,557,283, the teachings of which are incorporated herein by reference.

Transceiver 24 is a frequency modulated continuous wave (FMCW) heterodyne transceiver in one embodiment. Transceiver 24 operates with antenna array 22 to transmit and receive electromagnetic radiation at frequencies capable of penetrating non-metallic shoe materials to image the contents of the footwear in one embodiment. For example, electromagnetic radiation having a bandwidth within a range of about 500 MHz to about 100 GHz may be utilized in one embodiment. The bandwidth may be about 1 GHz to about 40 GHz in one more specific embodiment.

A motor 26 is provided to move antenna array 22 beneath the platform 20 during scanning operations in the example embodiment. The antenna array 22 is moved in a linear path below platform 20 in one embodiment described below.

A computer 28 is coupled with transceiver 24 and motor 26. Computer 28 controls various operations of scanning system 12 including emission of electromagnetic radiation and movement of antenna array 22 via motor 26. Furthermore, computer 28 may sample and process electrical signals from transceiver 24 which correspond to electromagnetic waves received by antenna array 22 to provide information regarding contents of footwear including objects which are concealed, for example, within the footwear of the individual.

Computer 28 includes processing circuitry 40 and storage circuitry 42 in the illustrated example. In one embodiment, processing circuitry 40 is arranged to process data, control data access and storage, issue commands, and control other desired operations. Processing circuitry 40 may comprise circuitry configured to implement desired programming provided by appropriate computer-readable storage media in at least one embodiment. For example, the processing circuitry 40 may be implemented as one or more processor(s) and/or other structure configured to execute executable instructions including, for example, software and/or firmware instructions. Other example embodiments of processing circuitry 40 include hardware logic, PGA, FPGA, ASIC, state machines, and/or other structures alone or in combination with one or more processor(s). These examples of processing circuitry 40 are for illustration and other configurations are possible.

Processing circuitry 40 is configured to control operations of systems 10, 12, process signals from transceiver 24 which correspond to received electromagnetic radiation as described above, and provide information regarding the results of scanning operations, including for example, information regarding contents within the footwear being scanned such as anomalies which may indicate the presence of objects of interest within the footwear. In one embodiment, processing circuitry 40 implements data processing such as image reconstruction using a 2D rectilinear Fourier based near field focusing algorithm using a non-free space dielectric constant in one embodiment.

Storage circuitry 42 is configured to store programming such as executable code or instructions (e.g., software and/or firmware), electronic data, databases, sampled data, or other digital information and may include computer-readable storage media. At least some embodiments or aspects described herein may be implemented using programming stored within one or more computer-readable storage medium of storage circuitry 42 and configured to control appropriate processing circuitry 40.

The computer-readable storage medium may be embodied in one or more articles of manufacture which can contain, store, or maintain programming, data and/or digital information for use by or in connection with an instruction execution system including processing circuitry 40 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

User interface 30 is configured to interact with a user including conveying data to a user, for example via a display (e.g., displaying visual images and text for observation by the user) as well as receiving inputs from the user, for example via a mouse and/or keyboard. User interface 30 is configured as a graphical user interface (GUI) in one embodiment. User interface 30 may be configured differently in other embodiments.

In one embodiment, the user interface 30 depicts results of the scanning operations, such as anomalies or objects which are concealed within the subject or article being scanned. The user interface 30 may generate an indication that the individual being scanned is not a risk or may indicate that the individual should be checked further in one embodiment.

Figure 3:
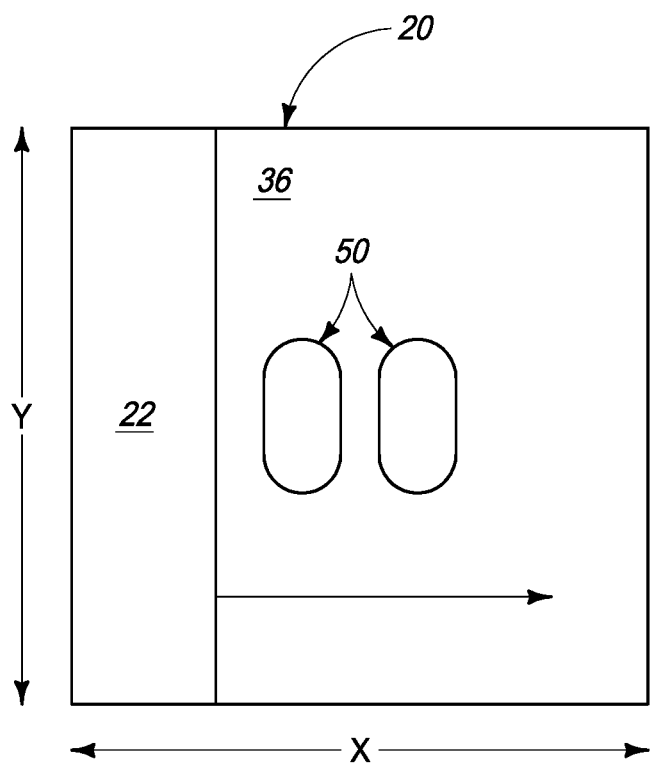
FIG. 3 is a plan view of a platform of a threat detection system according to one embodiment.

Referring to FIG. 3, a plan view of the platform 20 is shown. In addition, the antenna array 22 is also shown in the plan view for discussion purposes of example scanning operations while in the described embodiment the antenna array 22 lies below the platform 20 and would not be visible in the plan view. The platform 20 is physically coupled to antenna array 22 and the bottom of the footwear during scanning operations in one embodiment. The geometry and dielectric constant of dielectric material of platform 20 are designed to optimize energy transmission from the antenna array 22 into the platform 20 and into the footwear and back through the platform 20 into the antenna array 22 in one embodiment.

Threat detection system 10 uses an imaging system with sufficient resolution to isolate scattering contributions from separate scatterers in one embodiment. As mentioned above, electromagnetic radiation within an example bandwidth of 1-40 GHz is utilized in one embodiment. The use of this radiation enables scanning operations which provide a suitable combination of range and cross-range resolution while still penetrating and imaging inner contents of footwear. Platform 20 is utilized in one described arrangement to improve penetration of the electromagnetic waves into heterogeneous articles (such as the soles of shoes) and to reduce reflections of the electromagnetic energy. Electromagnetic radiation of other frequencies may be used in other embodiments.

Figure 4A:
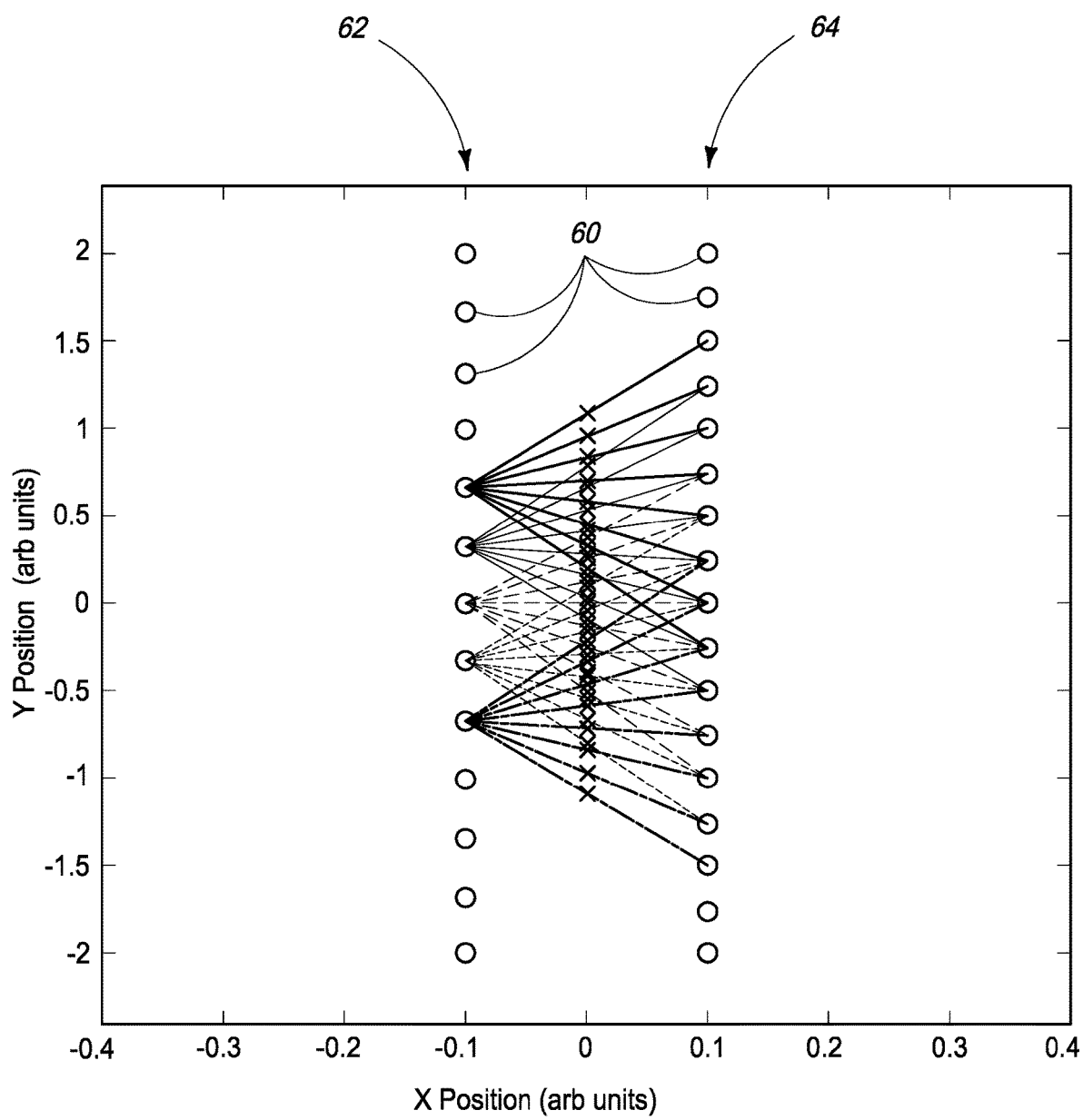
FIGS. 4A and 4B are graphical representations of an antenna array layout of a threat detection system according to one embodiment.
Figure 4B:
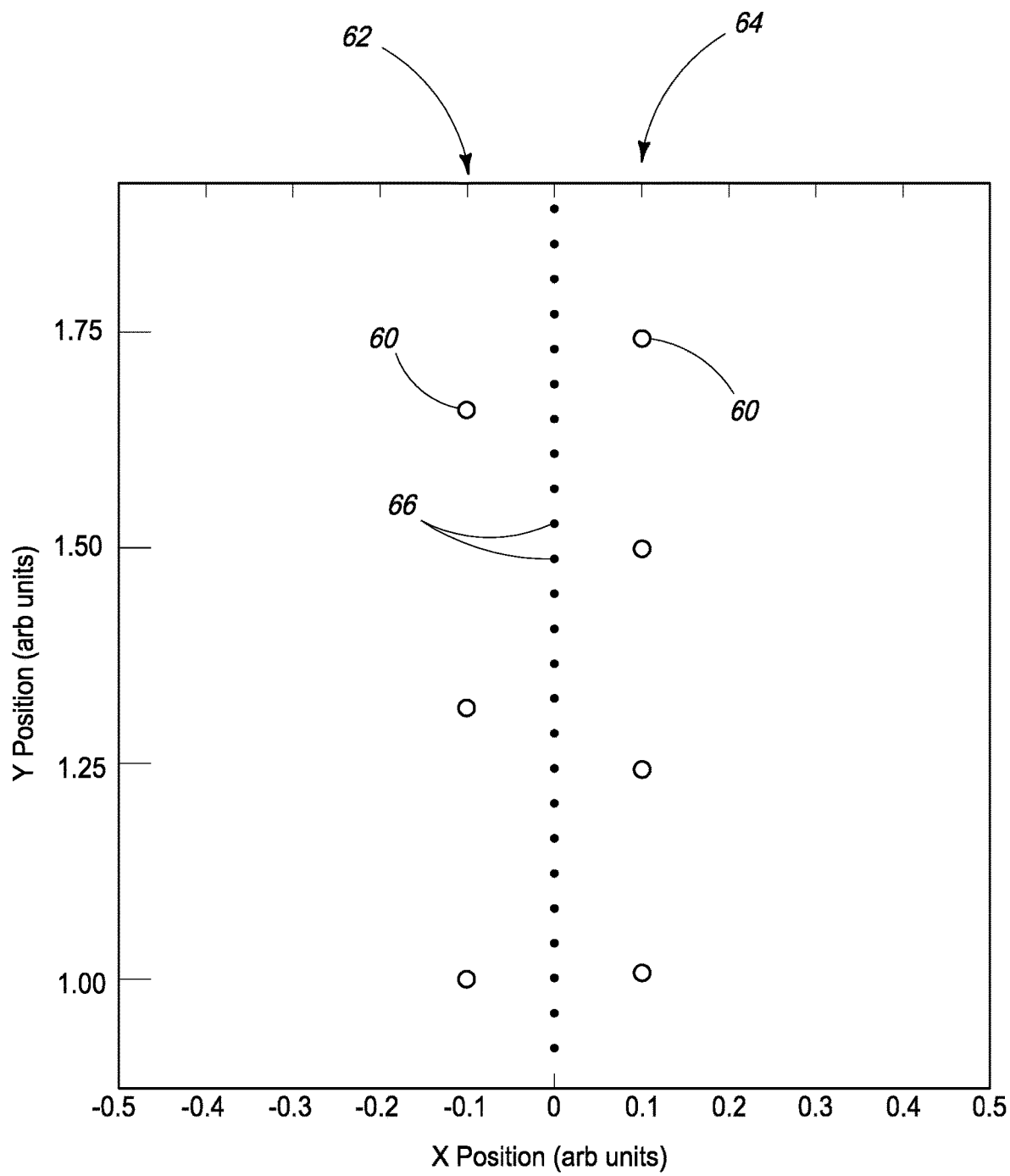

An individual being scanned would stand on the surface 36 of platform 20 in one example such that their footwear is positioned at locations 50 during scanning of the footwear. In one embodiment, the antenna array 22 includes a plurality of antennas which are shown in FIGS. 4A and 4B in a linear configuration in one example. In the described example, the antennas may be arranged in the array 22 along the y axis. Following the initiation of a scan, the antenna array 22 is moved along the x axis (orthogonal to the y axis) while electromagnetic radiation is transmitted into and received from the footwear positioned at locations 50. Following the completion of a scan, the antenna array 22 returns to the position shown in FIG. 3 for a subsequent scan, perhaps of another individual.

The example scanning geometry corresponds to the arrangement of the antennas upon the array 22 and movement of the antenna array 22 during scanning operations. In the described example, a 2D scanning aperture is utilized corresponding to the linear arrangement of antennas of the array 22 along the y axis and the rectilinear movement of the array 22 along the x axis during the transmission and reception of the electromagnetic radiation. The described example rectilinear scanning geometry was selected for scanning of footwear due to the generally rectangular shape of the soles of the footwear and the path-length variation as a function of this geometry resulted in tolerable multipath imaging artifacts (e.g., the artifacts appear as a physically thicker sole of the footwear).

In one embodiment, platform 20 is configured to enhance coupling of electromagnetic radiation emitted from the antenna array 22 though the platform 20 into the footwear of the individual being scanned (as well as the return path through the platform 20 into the antenna array 22). In one embodiment, the physical construction of the platform 20 as well as the materials of the platform 20 itself are configured to enhance propagation of electromagnetic radiation between the antenna array 22 and the footwear with reduced reflections at the interfaces of the platform 20 with respect to the antenna array 22 and footwear 50.

In one embodiment, the platform 20 comprises a material which corresponds to an article to be scanned. More specifically, it is desired to provide the platform 20 comprising material which propagates the electromagnetic radiation of interest (i.e., propagates electromagnetic energy within the frequency range of interest to implement the scanning) as well as having an impedance or dielectric constant which is similar to or matched with the footwear being scanned to minimize reflections at the interface of the footwear and the platform 20 and which may result in artifacts.

The thickness (i.e., the dimension between surfaces 36, 38) and material composition of platform 20 may be selected corresponding to the wavelengths of electromagnetic radiation being utilized. In general, the thickness may be reduced for materials having increased electric permittivity. In example embodiments, the platform 20 may have a thickness between 0-25 cm and an electric permittivity between 2-10, and perhaps 2-5 for use in scanning of footwear having rubber soles.

In one embodiment, the platform 20 comprises a homogeneous solid substrate having a dielectric constant or electrical permittivity which is matched to/corresponds with the dielectric constant or electrical permittivity of the footwear being scanned. If the type of sole of the footwear is known, then the material of the platform 20 may be selected to have a dielectric constant which is similar to or the same as the dielectric constant of the soles of the footwear. For example, the platform 20 may comprise a solid rubber substrate if the footwear has a rubber sole. In another example, various different types of footwear may be scanned (e.g., in a public setting) and the material of platform 20 may be selected to correspond to an average dielectric constant of numerous different types of footwear.

In addition, the thickness of the platform 20 may also be selected to enhance propagation of the electromagnetic radiation while reducing the presence of artifacts. In one embodiment, it is desired to have a thickness between opposing surfaces 36, 38 of at least a plurality of wavelengths of the electromagnetic radiation being utilized (e.g., a thickness greater than at least 5 wavelengths in one embodiment).

Figure 3A:
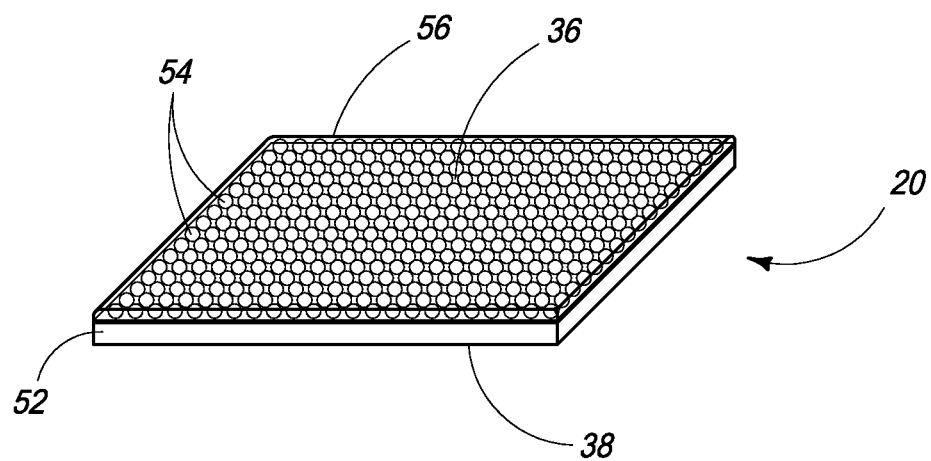
FIG. 3A is a perspective view of a platform of a threat detection system according to one embodiment.

Referring to FIG. 3A, the platform 20 may have a conformal upper surface 36 in one embodiment to reduce reflections at the interface of the footwear and the platform 20. For example, different soles of different footwear have various different types of treads or patterns and it is desired to reduce the presence of air gaps between the platform 20 and the footwear being scanned to reduce reflections of the electromagnetic energy at the interface of the footwear and platform 20. In one embodiment, upper surface 36 of platform 20 is configured to conform to different surface features (e.g., different tread patterns) of different soles of footwear to reduce the presence of the air gaps at the interface and which may reduce reflections of the electromagnetic energy compared with, for example, a rigid flat surface.

As discussed above, the platform 20 may comprise a substrate 52 of homogeneous material having an impedance which is matched to or corresponds to the footwear to be scanned in an example footwear scanning application. Furthermore, a plurality of members 54 may be provided at surface 36 to assist with reduction of air gaps at an interface of the footwear and the surface 36 of the platform 20. In one embodiment, the members 54 are free to move and may fill open spaces between the tread features of the soles of the footwear providing a conformal upper surface 36 and which reduces the presence of air gaps between the footwear and the platform 20 compared with a relatively hard, non-conformal surface.

In one embodiment, the members 54 comprise the same material as material of the substrate 52 to reduce or minimize reflections of the electromagnetic radiation passing between the substrate 52 and the members 54. In a more specific example embodiment for utilization in a footwear scanning application, the substrate 52 and members 54 may comprise the same type of rubber which may be selected to have a similar dielectric constant to soles of footwear. Furthermore, a thin protective retention layer, film or membrane 56, such as a durable plastic, latex, rubber, etc., may be provided over the members 54 to contain them upon the upper surface 36. In one embodiment, the film 56 has a thickness of approximately 10 mils.

Referring to FIG. 4A, a layout of antennas of the antenna array 22 is shown according to one embodiment. Additional details regarding example antenna arrays 22 which may be utilized are discussed in a US patent application having Ser. No. 13/629,849, now U.S. Pat. No. 8,937,570, entitled Apparatus for Synthetic Imaging of an Object, naming David M. Sheen as inventor, filed Sep. 28, 2012, and the teachings of which are incorporated herein by reference.

In the illustrated example embodiment, the antennas 60 are arranged in a plurality of columns 62, 64 and the antennas 60 in column 62 are utilized to transmit electromagnetic waves or radiation into the platform 20 and footwear thereon and the antennas 60 in column 64 are configured to receive the emitted electromagnetic waves or radiation reflected from the footwear being scanned and again passing through platform 20. The illustrated example antenna array is a 3:4 array including a ratio of three transmit antennas to four receive antennas. Other layouts of antennas 60 may be utilized in other embodiments.

A virtual sample point of the array corresponds to a transmit and receive pair of the antennas 60 and is located at the midpoint between the pair. These possible virtual sample points provided by the depicted layout are illustrated as Xs in FIG. 4A for a plurality of different possible pairs of antennas 60. In one embodiment, it is desired to select pairs of the antennas 60 which provide sample points for use in scanning which are spaced from one another along the y axis by a distance of approximately one quarter of the wavelength of the electromagnetic radiation being utilized. Once identified, these pairs of antennas 60 are used to provide transmission and reception of the electromagnetic radiation and the data resulting therefrom is sampled and processed to implement the scanning of the contents of the footwear or other object being scanned. The antennas 60 may be fed by transceiver 24 using an absorptive based electronic switch in one embodiment.

Referring to FIG. 4B, another layout of the antenna array 22 is shown at increased zoom compared with the layout of FIG. 4A. The antennas are arranged in respective transmit and receive columns 62, 64 and the possible virtual sample points which may be utilized by the illustrated layout are shown as dots 66. As mentioned above, the selected pairs of transmit and receive antennas 60 provide the sample points (dots 66) spaced apart from one another approximately one quarter of the wavelength of the electromagnetic radiation being utilized.

Figure 5:
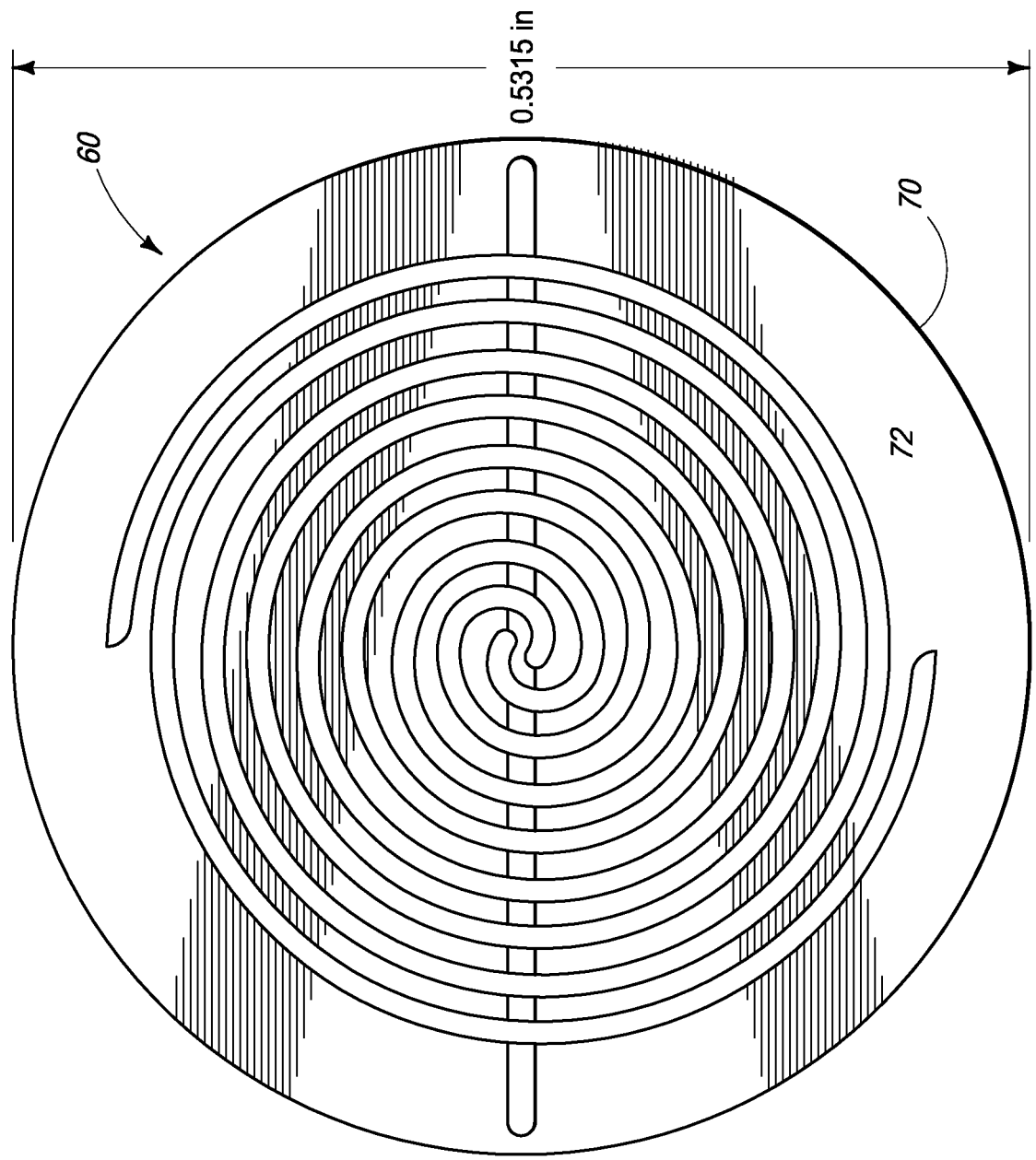
FIG. 5 is a plan view of an antenna of a threat detection system according to one embodiment.

Referring to FIG. 5, one example embodiment of an antenna 60 is shown. Antenna 60 utilized as a transmit antenna emits electromagnetic radiation having frequencies corresponding to the frequencies of electrical signals received from transceiver 24 and an antenna 60 utilized as a receive antenna outputs electrical signals to transceiver 24 as a result of received electromagnetic radiation. The antennas 60 of array 22 are individually implemented as a circular cross-polarized antenna having a 3 dB antenna gain pattern in the illustrated embodiment. More specifically, the antenna 60 is a cavity-backed dual-arm Archimedean spiral antenna for use with electromagnetic radiation within a 1-40 GHz bandwidth in one embodiment. The depicted antenna 60 provides a relatively wide beamwidth over the applicable bandwidth. In one embodiment, antenna 60 has a 51.85 degree (or greater) half-power beamwidth.

The illustrated antenna 60 incorporates a coaxial cable to microstrip transition which feeds a wideband exponentially tapered balun which is utilized to create balanced differential spatial lines which are soldered to the feed points of the two antenna arms in one embodiment. The antenna is mounted inside a cylindrical aluminum housing 70 embedded within radar absorbing material 72 within the cavity to reduce backward-directed energy produced by the antenna. In one embodiment, the material 72 may be the same as the material of platform 20. Furthermore, a thin coating of the same material may also be provided over the antennas 60 of the array 22 to protect the antennas 60. Other antenna configurations such as rectilinear may be utilized in other embodiments.

The field distribution for the illustrated antenna 60 includes a relatively high amplitude current distribution at the center region of the antenna 60 and lower amplitude current distribution at the outer regions of the antenna 60 at 20 GHz.

As mentioned above, the antennas of the array 22 may be circular cross-polarized antennas 60 where the transmit and receive antennas transmit and receive on opposite circular polarizations, respectively. For example, the transmitting antennas may be left-hand circularly polarized and the receiving antennas may be right-hand circularly polarized in one embodiment. A circular cross-polarized system reduces imaging artifacts due to multipath in reflectance based imaging modalities (e.g., millimeter-wave) by receiving electromagnetic waves of opposite circular polarized handedness relative to the transmitted waves. Since the polarity of a circularly polarized wave is reversed upon reflection from a surface, this example described system only receives waves that have experienced an odd number of reflections. This is useful for reducing imaging artifacts associated with relatively high amplitude signals that have experienced an even number of reflections.

Additional details regarding antennas 60 which may be utilized to implement scanning operations are discussed in U.S. Pat. Nos. 7,253,766, 7,034,746, and 7,986,260, the teachings of which are incorporated herein by reference.

Figure 6:
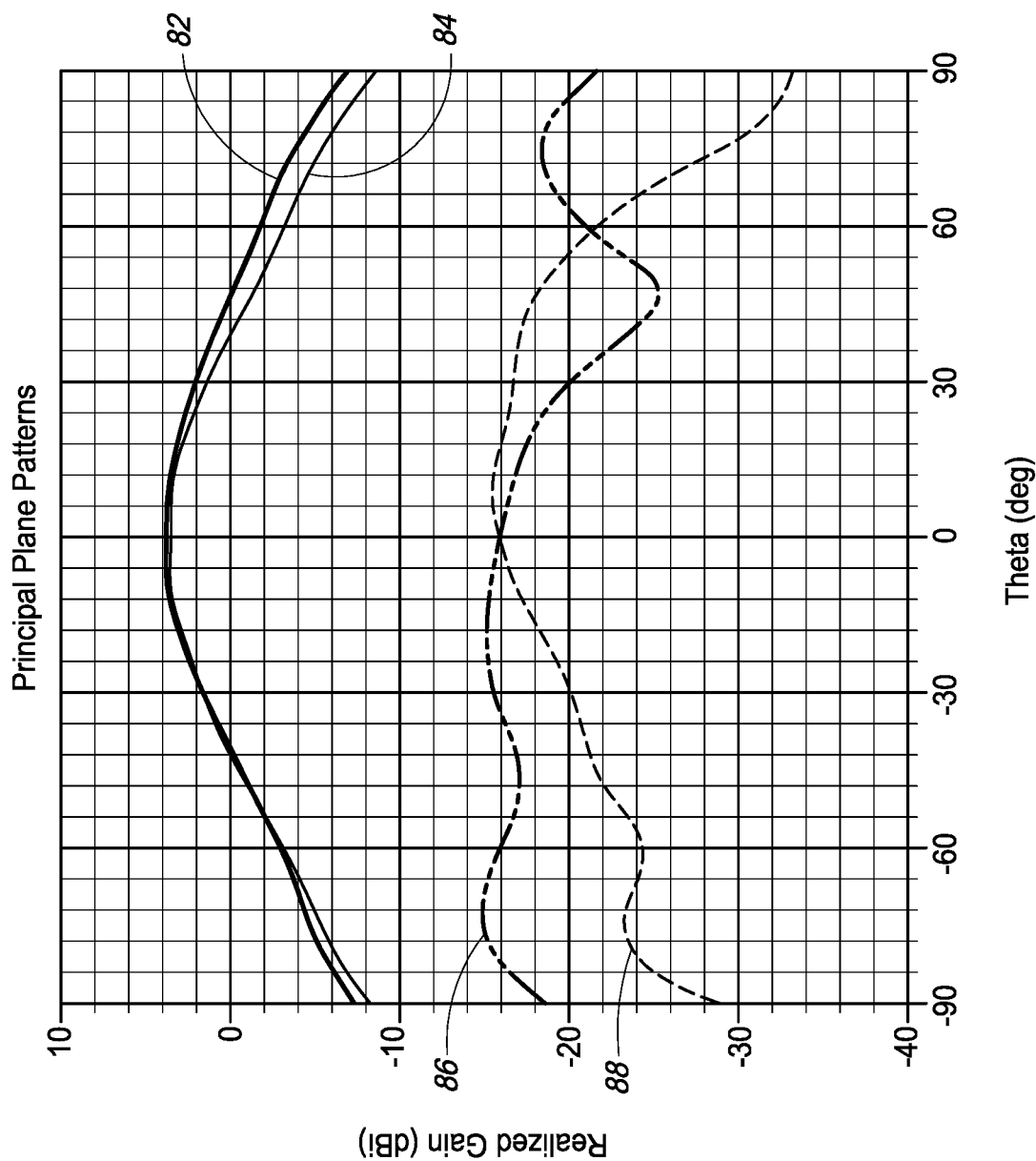
FIG. 6 is a graphical representation of beam patterns of the antenna of FIG. 5.

Referring to FIG. 6, a simulated spiral antenna beam gain pattern is shown in the two principal planes at 20 GHz as a function of angle. The desired RHCP upper curves 82, 84 and undesired LHCP lower curves 86, 88 are shown.

Figure 7:
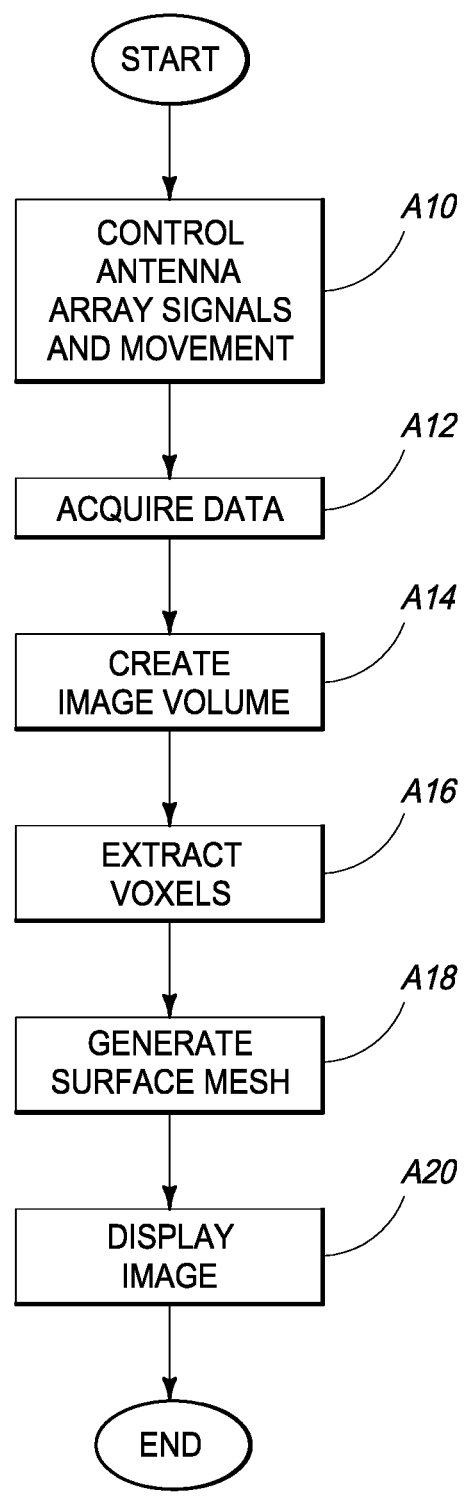
FIG. 7 is a computational process flow chart according to one embodiment.

Referring to FIG. 7, one method for implementing a scan of a subject such as footwear is shown according to one embodiment. The illustrated method may be implemented by processing circuitry 40 in one implementation. Other methods are possible including more, less and/or alternative acts.

At an act A10, the processing circuitry initiates scanning operations by initiating movement of the antenna array and controlling the emission of electromagnetic waves from transmit antennas of the antenna array. Additional details of this act according to one embodiment are described in U.S. Pat. Nos. 5,455,590, 5,557,283 and 7,405,692, the teachings of which are incorporated herein by reference.

At an act A12, the processing circuitry controls sampling operations. In one embodiment, processing circuitry controls sampling of analog-to-digital conversion circuitry of the computer which is utilized to convert intermediate frequency signals from the transceiver into signal vectors which may be utilized for image reconstruction. Additional details of this act according to one embodiment are described in U.S. Pat. Nos. 5,455,590, 5,557,283 and 7,405,692, the teachings of which are incorporated herein by reference.

At an act A14, the processing circuitry implements a generalized synthetic aperture focusing technique (GSAFT) to generate a three dimensional image volume where each voxel value is proportional to a scatterer reflectance value. Additional details of this act according to one embodiment are described in U.S. patent application Ser. No. 13/629,849, now U.S. Pat. No. 8,937,570, incorporated by reference above and Mensa, D., High Resolution Radar Cross-Section Imaging, Norwood, MA, Artech House, 1991, the teachings of which are incorporated herein by reference. As discussed in U.S. Pat. No. 8,937,570, phase information of the received electromagnetic waves is processed in some embodiments to implement screening operations.

At an act A16, preprocessing may be performed where voxels are extracted for mesh generation using an amplitude threshold value or a derivative based threshold value in example implementations. In one amplitude thresholding example, the threshold may be varied to select different voxels for use in the surface reconstruction and segmentation and contrast enhancement may be performed. In one specific embodiment, only voxels having intensity values above a threshold are utilized. Thresholding may be used to isolate high intensity scatterers in one embodiment.

At an act A18, a surface mesh is created using image processing software, such as VolumeRover, available from the Computational Visualization Center. Depth information can be preserved and used to convey the location of high intensity reflectors present in an imaged scene. This example software uses multiple surface reconstruction algorithms to create a smooth surface given an input volumetric point cloud. In one embodiment, preprocessing algorithms may be used to convert point cloud values to be proportional to the feature of interest and the new point clouds can be imported into surface reconstruction modules for segmentation.

At an act A20, information is provided regarding contents within the footwear, perhaps concealed. In one more specific example, an image of the footwear and the contents within the footwear resulting from the previous processing is displayed including objects which may be concealed within the footwear itself or between the footwear and the feet of the individual. An individual of interest may be selected for further inspection if a possible threat is observed in an image.

The image may also be processed using feature extraction and classification algorithms to identify objects of interest. Additional details are discussed in McMakin, D., Keller, P., Sheen, D., Hall, T., *Dual-Surface Dielectric Depth Detector for Holographic Millimeter-Wave Security Scanners*, Proc. SPIE. 7309, Passive Millimeter-Wave Imaging Technology XII 73090G, May 1, 2009; McMakin, D., Hall, T., Sheen, D., *Holographic Radar Imaging Privacy Techniques Utilizing Dual-Frequency Implementation*, Proc. SPIE. 6943, Sensors, and Command, Control, Communications, and Intelligence (C3I) Technologies for Homeland Security and Homeland Defense VII 69430P, Apr. 3, 2008; Keller, P., McMakin, D., Sheen, D., McKinnon, A. D., Summet, J., *Privacy Algorithm for Airport Passenger Screening Portal*, Proc. SPIE. 4055, Applications and Science of Computational Intelligence III 476, Mar. 30, 2000; and McMakin, D., Sheen, D., Hall, T., Kennedy, M., Foote, H., *Biometric Identification using Holographic Radar Imaging Techniques*, Proc. SPIE. 6538, Sensors, and Command, Control, Communications, and Intelligence (C3I) Technologies for Homeland Security and Homeland Defense VI 65380C, Apr. 27, 2007, the teachings of which are incorporated herein by reference.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A footwear scanning method comprising:
   transmitting a plurality of electromagnetic waves into footwear;
   after the transmitting, receiving electromagnetic waves from the footwear;
   processing the electromagnetic waves received from the footwear to implement synthetic imaging of the footwear which provides information regarding contents within the footwear;
   wherein the transmitting comprises upwardly emitting the transmitted electromagnetic waves from an antenna array positioned below a sole of the footwear into the sole of the footwear and the received electromagnetic waves from the footwear are reflected by the footwear; and
   wherein all of the received electromagnetic waves that are processed to provide the information regarding the contents of the footwear are received by the antenna array positioned below the sole of the footwear.

2. The method of claim 1 wherein the upwardly emitting comprises passing the transmitted electromagnetic waves through a platform intermediate the antenna array and the footwear.

3. The method of claim 2 wherein the receiving comprises receiving the received electromagnetic waves from the footwear after passage thereof through the platform.

4. The method of claim 2 wherein the platform has an electric permittivity between 2-10.

5. The method of claim 2 wherein the platform comprises an upper surface that supports the footwear during the transmitting and the receiving, and wherein the upper surface of the platform is configured to conform to surface features of soles of the footwear.

6. The method of claim 1 further comprising applying electrical signals to an antenna of the antenna array, and wherein the transmitting comprises transmitting the transmitted electromagnetic waves from the antenna in the form of microwaves which correspond to the electrical signals.

7. The method of claim 1 further comprising conducting a plurality of electrical signals from a transceiver to a plurality of antennas of the antenna array and vice-versa via a plurality of electrical conductors, and wherein the electrical signals correspond to the transmitted and received electromagnetic waves.

8. The method of claim 7 further comprising a plurality of switches individually configured to selectively conduct the electrical signals between the transceiver and a respective one of the antennas.

9. The method of claim 1 wherein the antenna array comprises a plurality of transmit and receive pairs of antennas, and further comprising:
identifying a plurality of transmit and receive pairs of antennas from others of the transmit and receive pairs of antennas; and
using the identified transmit and receive pairs of antennas to transmit and receive the electromagnetic waves.

10. The method of claim 9 further comprising moving the antenna array in an x axis direction during the transmitting and receiving, wherein each of the transmit and receive pairs of antennas define a sample point, and wherein adjacent ones of the sample points defined by different ones of the identified transmit and receive pairs of antennas are spaced from one another along a y axis direction by a distance of less than a wavelength of the electromagnetic waves, and wherein the distance is approximately one quarter of the wavelength of the electromagnetic waves.

11. The method of claim 1 further comprising moving the antenna array in an x axis direction during the transmitting and receiving, and wherein the antenna array comprises a plurality of transmit antennas arranged in a first column and a plurality of receive antennas arranged in a second column, wherein the first and second columns are individually arranged in a y axis direction perpendicular to the x axis direction, and wherein the first and second columns are spatially separated from one another in the x axis direction.

12. The method of claim 1 wherein the transmitting comprises transmitting using an antenna of the antenna array having a wide beamwidth over a bandwidth of the electromagnetic waves, and wherein the antenna has at least a 51.85 degree half-power beamwidth.

13. The method of claim 1 wherein the processing to implement the synthetic imaging comprises implementing a generalized synthetic aperture focusing technique to generate a three-dimensional image volume where each voxel value is proportional to a scatterer reflectance value.

14. The method of claim 1 wherein the transmitting comprises transmitting the electromagnetic waves within a frequency range of 1 GHz to 40 GHz.

15. The method of claim 1 wherein the processing comprises generating a three-dimensional image volume comprising a plurality of voxels.

16. The method of claim 1 wherein the transmitting comprises frequency modulating a continuous wave to generate the electromagnetic waves.

17. The method of claim 1 wherein the transmitting comprises transmitting using a frequency modulated continuous wave (FMCW) transceiver.

18. The method of claim 1 wherein the processing comprises processing phase information of the electromagnetic waves received from the footwear.

19. The method of claim 1 wherein the receiving comprises sampling the electromagnetic waves at a plurality of sample points that are spaced from one another by a distance of approximately one quarter of a wavelength of the electromagnetic waves.

20. A footwear scanning method comprising:
transmitting a plurality of electromagnetic waves into footwear;
after the transmitting, receiving electromagnetic waves from the footwear;
processing the electromagnetic waves received from the footwear to implement synthetic imaging of the footwear which provides information regarding contents within the footwear;
wherein the transmitting comprises upwardly emitting the transmitted electromagnetic waves from an antenna array positioned below a sole of the footwear into the sole of the footwear and the received electromagnetic waves from the footwear are reflected by the footwear;
wherein the upwardly emitting comprises passing the transmitted electromagnetic waves through a platform intermediate the antenna array and the footwear; and
wherein the platform comprises a solid homogeneous substrate.

21. The method of claim 20 wherein the solid homogenous substrate is rubber.

22. A footwear scanning method comprising:
transmitting a plurality of electromagnetic waves into footwear;
after the transmitting, receiving electromagnetic waves from the footwear;
processing the electromagnetic waves received from the footwear to implement synthetic imaging of the footwear which provides information regarding contents within the footwear;
wherein the transmitting comprises upwardly emitting the transmitted electromagnetic waves from an antenna array positioned below a sole of the footwear into the sole of the footwear and the received electromagnetic waves from the footwear are reflected by the footwear;
wherein the upwardly emitting comprises passing the transmitted electromagnetic waves through a platform intermediate the antenna array and the footwear; and
wherein the platform has a thickness in a direction of the transmission of the transmitted electromagnetic waves into the footwear, and wherein the thickness of the platform is greater than at least five times a wavelength of the transmitted electromagnetic waves.

23. A footwear scanning method comprising:
transmitting a plurality of electromagnetic waves into footwear;
after the transmitting, receiving electromagnetic waves from the footwear;
processing the electromagnetic waves received from the footwear to implement synthetic imaging of the footwear which provides information regarding contents within the footwear;
wherein the transmitting comprises upwardly emitting the transmitted electromagnetic waves from an antenna array positioned below a sole of the footwear into the sole of the footwear and the received electromagnetic waves from the footwear are reflected by the footwear;
wherein the upwardly emitting comprises passing the transmitted electromagnetic waves through a platform intermediate the antenna array and the footwear; and
wherein the platform comprises a material having an impedance that corresponds to the sole of the footwear.

24. A footwear scanning method comprising:
transmitting a plurality of electromagnetic waves into footwear;
after the transmitting, receiving electromagnetic waves from the footwear;
processing the electromagnetic waves received from the footwear to implement synthetic imaging of the footwear which provides information regarding contents within the footwear;
wherein the transmitting comprises upwardly emitting the transmitted electromagnetic waves from an antenna array positioned below a sole of the footwear into the sole of the footwear and the received electromagnetic waves from the footwear are reflected by the footwear; and wherein the processing comprises identifying a plurality of voxels having respective intensity values above a threshold.

* * * * *